(12) United States Patent
Kitamura (10) Patent No.: US 7,614,835 B2
(45) Date of Patent: Nov. 10, 2009

(54) SIMPLE FASTENING DEVICE

(75) Inventor: Yoshiharu Kitamura, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 10/581,265

(22) PCT Filed: Nov. 30, 2004

(86) PCT No.: PCT/JP2004/017803

§ 371 (c)(1),
(2), (4) Date: Jun. 8, 2007

(87) PCT Pub. No.: WO2005/054691

PCT Pub. Date: Jun. 16, 2005

(65) Prior Publication Data

US 2007/0243046 A1 Oct. 18, 2007

(30) Foreign Application Priority Data

Dec. 1, 2003 (JP) .............................. 2003-402111

(51) Int. Cl.
*F16B 37/08* (2006.01)

(52) U.S. Cl. .................... 411/433; 411/265; 24/656

(58) Field of Classification Search ......... 411/265–267, 411/317, 318, 433; 24/652, 656, 115 G
See application file for complete search history.

(56) References Cited

U.S. PATENT DOCUMENTS

| 221,814 | A | * | 11/1879 | Hazelwood | 411/318 |
| 422,361 | A | * | 3/1890 | Alton | 411/433 |
| 647,435 | A | * | 4/1900 | Bean | 411/317 |
| 2,209,495 | A | * | 7/1940 | Scholfield | 279/8 |
| 3,160,187 | A | * | 12/1964 | Zahofiakin | 411/267 |
| 3,393,598 | A | * | 7/1968 | Bettinger | 411/433 |
| 4,083,393 | A | * | 4/1978 | Okada | 411/267 |
| 5,378,100 | A | * | 1/1995 | Fullerton | 411/267 |
| 5,749,691 | A | * | 5/1998 | Campbell | 411/433 |

FOREIGN PATENT DOCUMENTS

| JP | 5550203 | 12/1980 |
| JP | 10-103331 A | 4/1998 |
| JP | 2003-83316 A1 | 3/2003 |

OTHER PUBLICATIONS

Microfilm of the specification and drawings annexed to the request of Japanese Utility Model Application No. 36748/1971(Laid-Open No. 33458/1972) (Ben Shoshu) Dec. 14, 1972.

* cited by examiner

*Primary Examiner*—Flemming Saether
(74) *Attorney, Agent, or Firm*—Lowe Hauptman Ham & Berner, LLP (57) ABSTRACT

A simple fastening device has a structure where a lock piece is forced by a spring to engage with an axial member in a case 1. When the axial member 6 is inserted into the case, the lock piece is moved away from the axial member by a releasing member. The lock piece is connected to the releasing member by a pin.

2 Claims, 9 Drawing Sheets

SIMPLE FASTENING DEVICE

CROSS-REFERENCE TO RELATED APPLICATIONS

The present Application is based on International Application No. PCT/JP2004/017803, filed on Nov. 30, 2004, which in turn corresponds to Japan Application No. 2003-402111 filed on Dec. 1, 2003, and priority is hereby claimed under 35 USC §119 based on these applications. Each of these applications are hereby incorporated by reference in their entirety into the present application.

FIELD OF THE INVENTION

The present invention relates to a simple fastening device that is used for affixing and releasing—by one-step operation—equipment and apparatuses in buildings, electrical appliances, machinery, and automobiles.

BACKGROUND OF THE INVENTION

A conventional simple fastening device for fastening the equipment and apparatuses described above is disclosed in Japanese Publication of Examined Patent Application [Toku-kosho] No. 55-50203.

A conventional simple fasting device uses a bolt to achieve the fastening and thus a tapered hole is formed in a case into which the bolt is inserted, and a plurality of nut segments are provided to slide into the tapered hole. The nut segments engage with and fasten to the bolt. In this case, a spring disposed on the top of each nut segment forces the nut segment in the direction for engaging it with the bolt. An operation ring is provided for releasing the nut segment from the bolt.

The operation ring is disposed in the case in such a way as to be able to turn, and a cam is formed inside of the ring so that a guide pin installed in the nut segment can slide. The surface of the cam is formed in such a way so as to stop the nut segment at the lower limit of fastening to the bolt and at the upper limit of releasing the nut segment from the bolt, so as to limit the movement of the nut segment between those two limits.

In such a simple fastening device, a bolt can be inserted into the case because by inserting the bolt into the case the nut segment rises along the tapered hole against the force of the spring. After inserting the bolt into the case, the force of the spring causes the nut segment to move down so as to face the bolt, so that the nut segment engages with the bolt to be fastened when the case is turned in the fastening direction.

In order to remove the bolt, the operation ring is turned and the cam pin is slid along the cam. With this turning, the nut segment moves from the lower-limit position to the upper-limit position, so as to be released from the bolt.

In order for the bolt to be fastened again, the operation ring is turned in the fastening direction. By this operation, the guide pin slides on the cam surface and the nut segment moves from the upper-limit position to the lower-limit position so as to enter into a standby state for fastening the bolt.

(Patent document) Japanese Publication of Examined Patent Application No. 55-50203

A conventional simple fastening device enables the bolt to be fastened by the one-step operation of inserting the bolt into the case. However, in order to remove the bolt, the operation ring must again be turned in order for the nut segment to move, resulting in troublesome operation to remove the bolt.

Moreover, in order to fasten the bolt, the operation ring must be turned in order for the nut segment to return to the standby state. Accordingly, the operation ring must be turned in order to put the bolt in and out, resulting in troublesome operation and less usability.

Further, a complex cam part must be formed in the operation ring in order for the nut segment to move, so that the structure of the operation ring becomes complex and assembly of the whole device become troublesome.

The problems of the conventional art are solved by the present invention, whose objective is to provide a simple fastening device that (1) enables fastening of an axial member such as a bolt by a one-step operation, (2) has the advantage of releasing the bolt from being fastened without the need for a special operation to put the axial member in and out, and (3) has a simple structure that makes the device easy to assemble.

DISCLOSURE OF THE INVENTION

In order to attain the above objective, the simple fastening device according to a first embodiment of the invention is characterized such that (1) has a structure wherein (a) a lock piece is forced by a spring to engage with an axial member in a case, and (b) when the axial member is inserted into the case, the lock piece moves back from the axial member, (c) later, the lock piece is engaged with the axial member so as to be fastened with the axial member; and (2) contains a releasing member that is jointed together with the lock piece in such a way that the releasing member is provided in the case so as to move linearly so as to release the lock piece from fastening, thereby releasing the lock piece from the axial member.

In the first embodiment, when the axial member is being inserted into the case, the lock piece moves back from the axial member. Later, the lock piece is engaged with the axial member so as to be fastened with the axial member. Therefore, fastening the axial member can be done by a one-step operation.

The releasing member that is disposed in the case so as to move linearly is jointed with the lock piece, and this jointing is done in such a way that the lock piece moves back from the axial member when the releasing member moves linearly. Accordingly, when the releasing member moves linearly, the lock piece moves back from the axial member and is then released from being engaged with the axial member. The releasing is done not by turning, but by an operation of linear movement. As a result, usability is improved.

Further, the remaining member is connected with the lock piece in such a way that the force of the spring causes the releasing member and the lock piece to automatically return to their original positions, which is the standby state, after releasing them from being fastened to each other. Therefore, re-fastening of the lock piece to the axial member can be done without any extra motion. Thus, no operation is needed for the releasing member and the lock piece to enter into the standby state each time that the axial member is inserted into and removed from the case. Thus, usability is improved.

Moreover, it is only necessary that the releasing member moves linearly against the case, leading to a simple structure and facilitating assembly.

The above mentioned embodiment is such that (1) said releasing member can move linearly in the direction perpendicular to the insertion direction of the axial member, and (2) said spring forces the releasing member to move in the direction perpendicular to the insertion direction of the axial member, so that said spring forces the lock piece, to engage with the axial member via the releasing member.

Further, the releasing member can move linearly in the direction perpendicular to the insertion direction of the axial member, so that the linear movement of the releasing member does not interfere with the axial member, which improves usability.

The lock piece is forced through the releasing member by the spring, so that a single spring can force both the lock piece and the releasing member as well. Accordingly it is not necessary that one spring be provided for the releasing member and another spring be provided for the axial member, which decreases the number of the fastening device's components, resulting in a simple structure and easy assembly.

A further embodiment is such that (1) guide grooves that extend in the direction perpendicular to the insertion direction of the axial member are formed on the outer surface of the case, (2) the releasing member has guide arms that slide in the guide grooves, and (3) the guide arms and the lock piece are jointed together by means of a pin.

In the above arrangement because the guide, arms disposed on the releasing member slide in the grooves on the outer surface of the case, the releasing member moves linearly and steadily, which is a feature that further improves usability.

A further embodiment is such that (1) the case has a slope that extends away from the axial member in the insertion direction of the axial member, and (2) there are formed in the case (a) a tapered section on which the lock pieces slide, and (b) a supporting wall that faces the tapered section and supports the outer surface of the axial member with which the lock pieces engage.

In the above arrangement the lock pieces slide along the case's tapered section, and said lock pieces can move in the releasing or engagement direction of the axial member resulting in stable operation. The supporting wall is formed in the tapered section to support the axial member, leading to rigid and steady fastening of the lock piece to the axial member.

BRIEF DESCRIPTION OF THE DRAWINGS

FIGS. 2(a), (b), and (c) are a plan view, a side view, and a left-side view, respectively, of the first embodiment.

FIGS. 5(a), (b), and (c) are a plan views a front view, and a left-side view, respectively, of the first embodiment.

FIG. 8(a) is a plan view of the lock piece, and (b) is an E-to-E cross-sectional view.

FIG. 9(a) is a plan view of the releasing member in the first embodiment, and (b) is an E-to-E cross-sectional view thereof.

FIG. 12(a) is a plan view of the cap in the first embodiment, and (b) is an H-to-H cross-sectional view thereof.

FIGS. 13(a), (b), (c) and (d) are cross-sectional views showing the operation of the first embodiment.

FIGS. 15(a), (b), (c), and (d) are cross-sectional views showing the operation of the second embodiment.

FIGS. 16(a) and (b) are a plan view and a front view, respectively, of the third embodiment.

FIGS. 18(a) and (b) are a plan view and a front view, respectively, of the fourth embodiment.

FIGS. 20(a) and (b) are a plan view and a front view, respectively, or the axial member of the fourth embodiment.

NUMBERS USED IN THE DRAWINGS 10, 20, 30 simple fastening device
1 case
1a insertion hole
1b tapered section
1c supporting wall
1d guide groove
3 lock piece
4 spring
5 releasing member
5b guiding arm
7 spring pin
6 bolt, (axial member)
9, 15 axial member

PREFERRED EMBODIMENT OF THE INVENTION

Hereafter, the present invention is described with reference to the drawings of the preferred embodiments. For each embodiment, the corresponding members have the same numbers.

The First Embodiment

Figure 1:
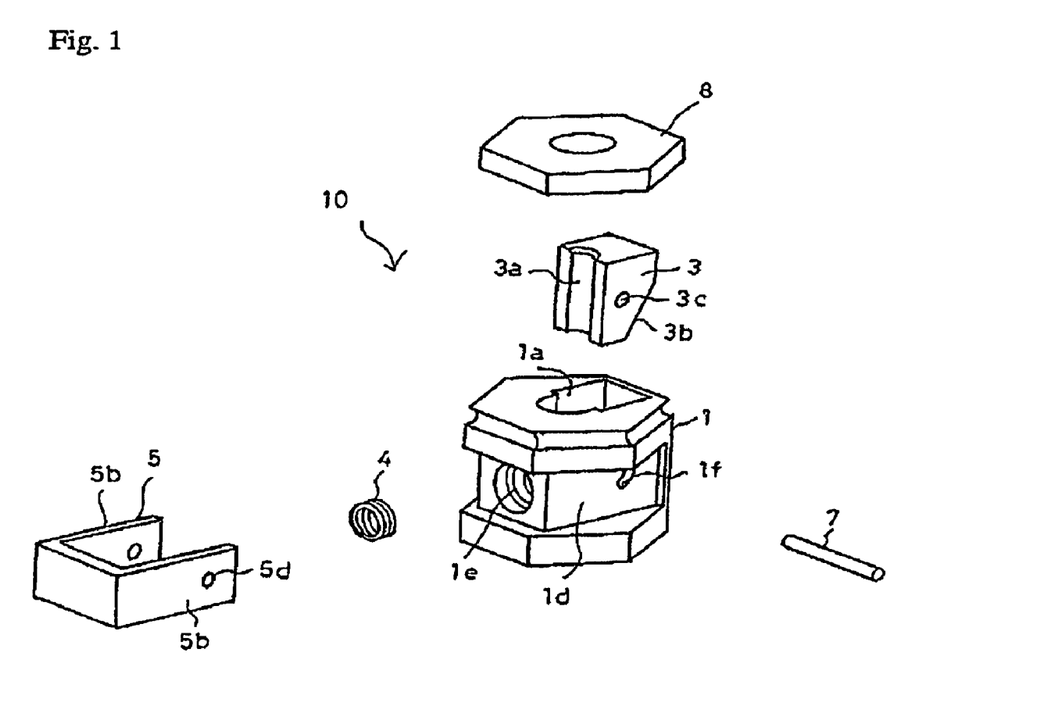
FIG. 1 is a perspective view of the first embodiment of the present invention in a disassembled condition.
Figure 2:
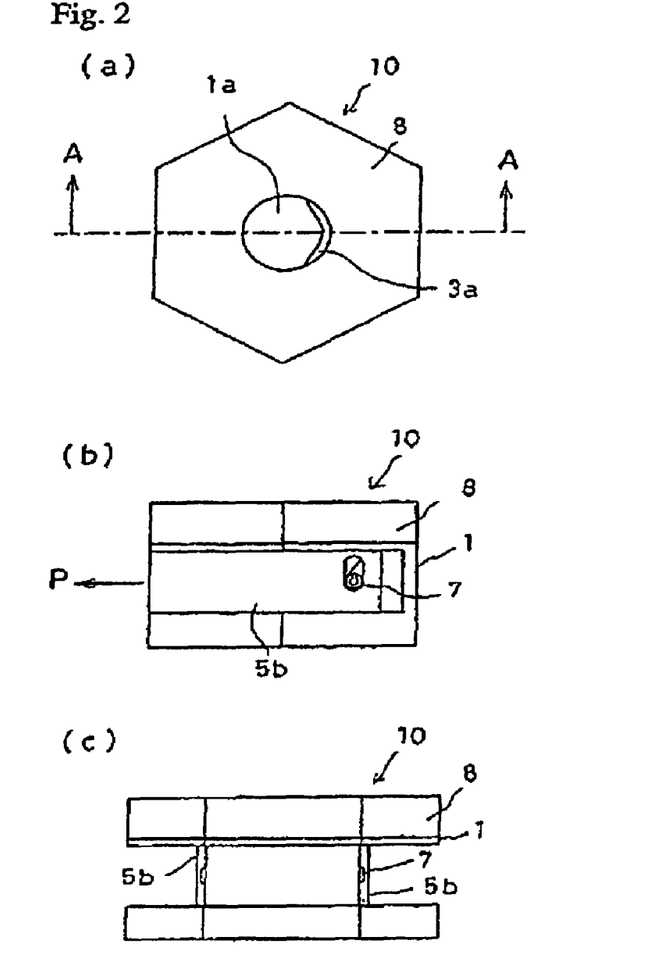
Figure 3:
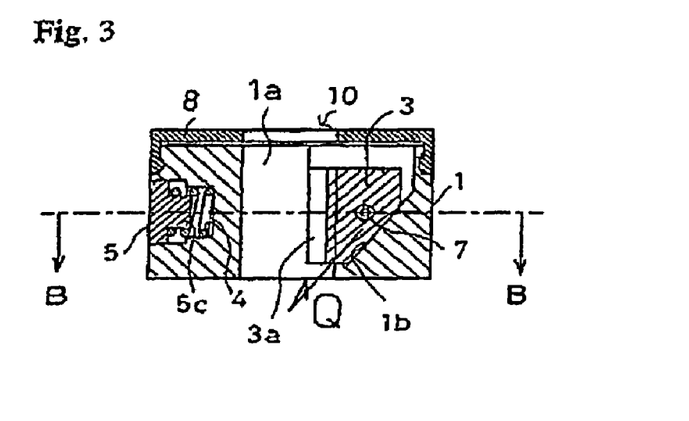
FIG. 3 is an A-to-A cross-sectional view of FIG. 2(a).
Figure 4:
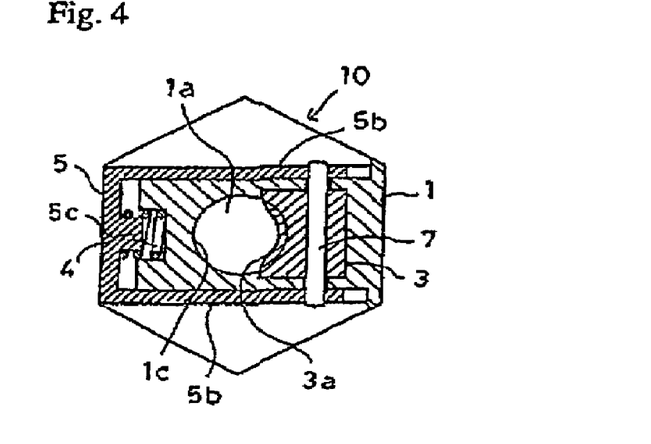
FIG. 4 is a B-to-B cross-sectional view of FIG. 3.
Figure 5:
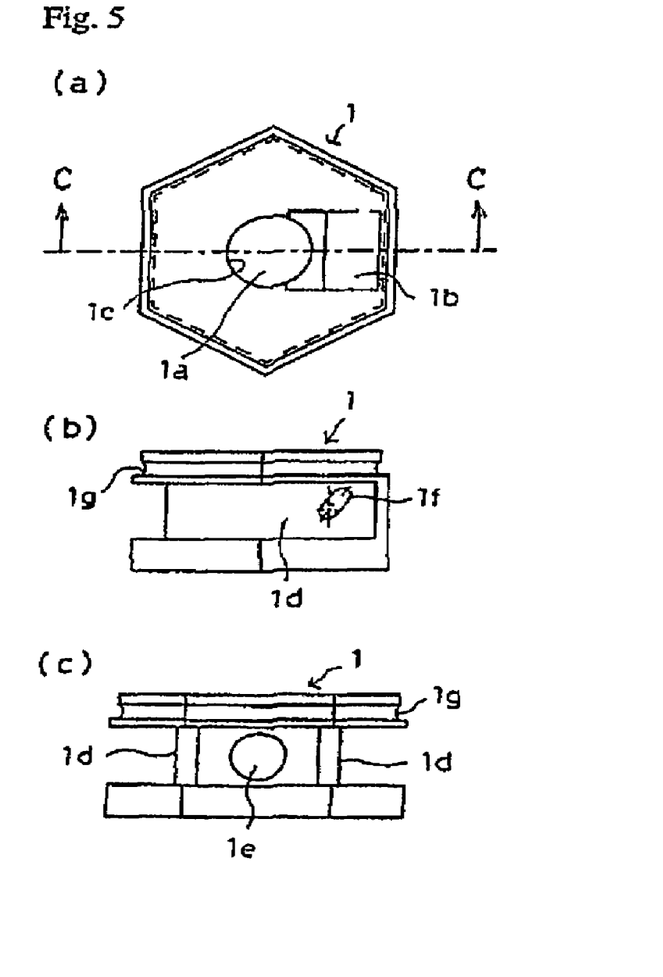
Figure 6:
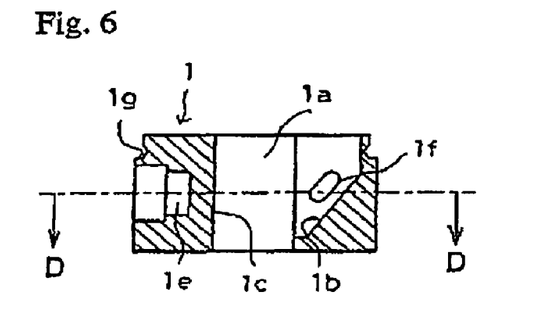
FIG. 6 is a C-to-C cross-sectional view of FIG. 5(a).
Figure 7:
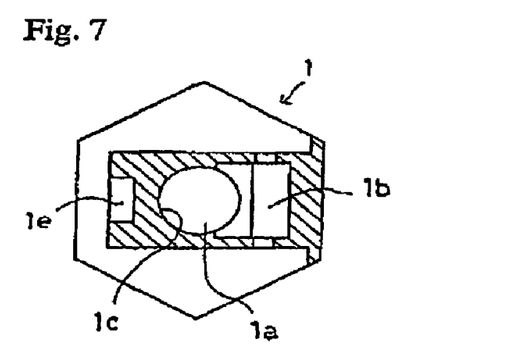
FIG. 7 is a B-to-B cross-sectional view of FIG. 6.
Figure 8:
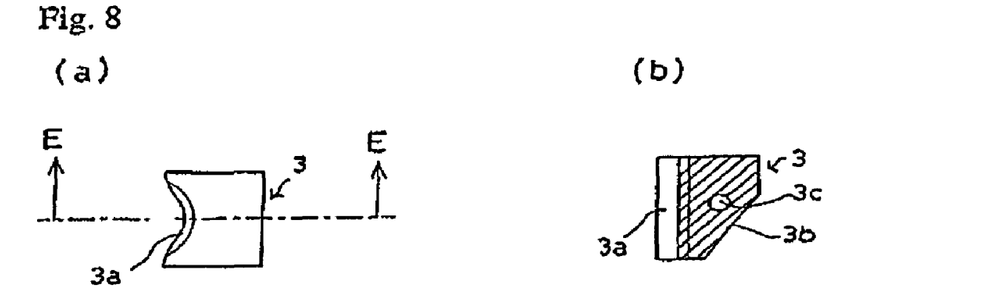
Figure 9:
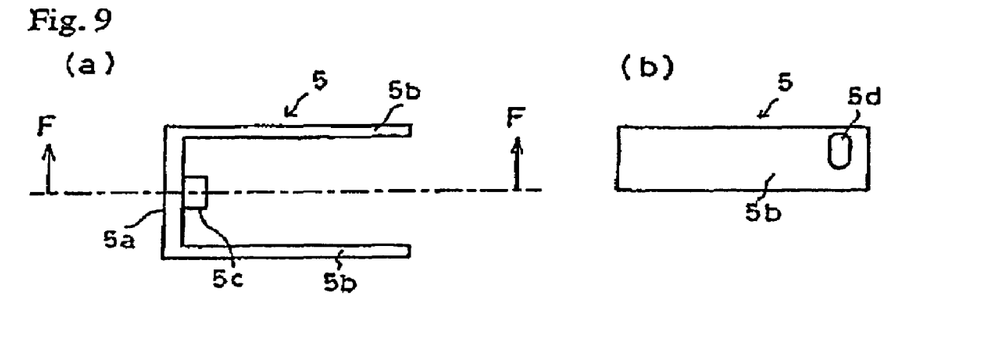
Figure 10:
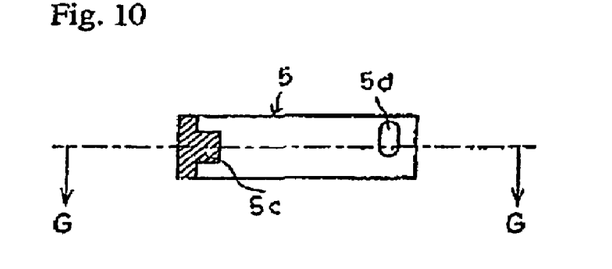
FIG. 10 is an F-to-F cross-sectional view of FIG. 9(a).
Figure 11:
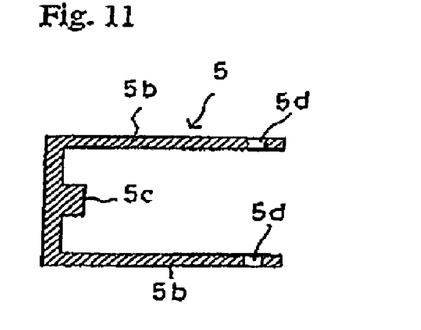
FIG. 11 is a cross-sectional view of FIG. 10.
Figure 12:
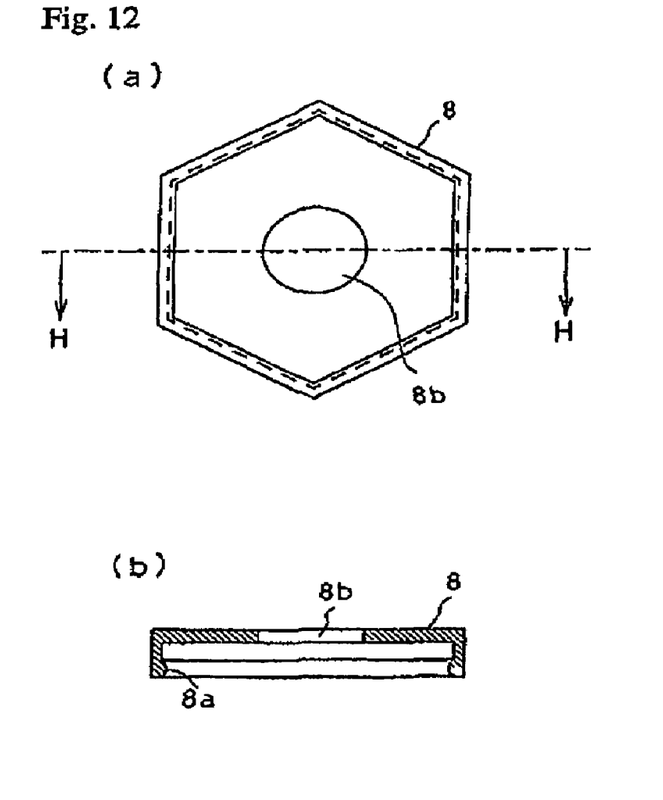
Figure 13:
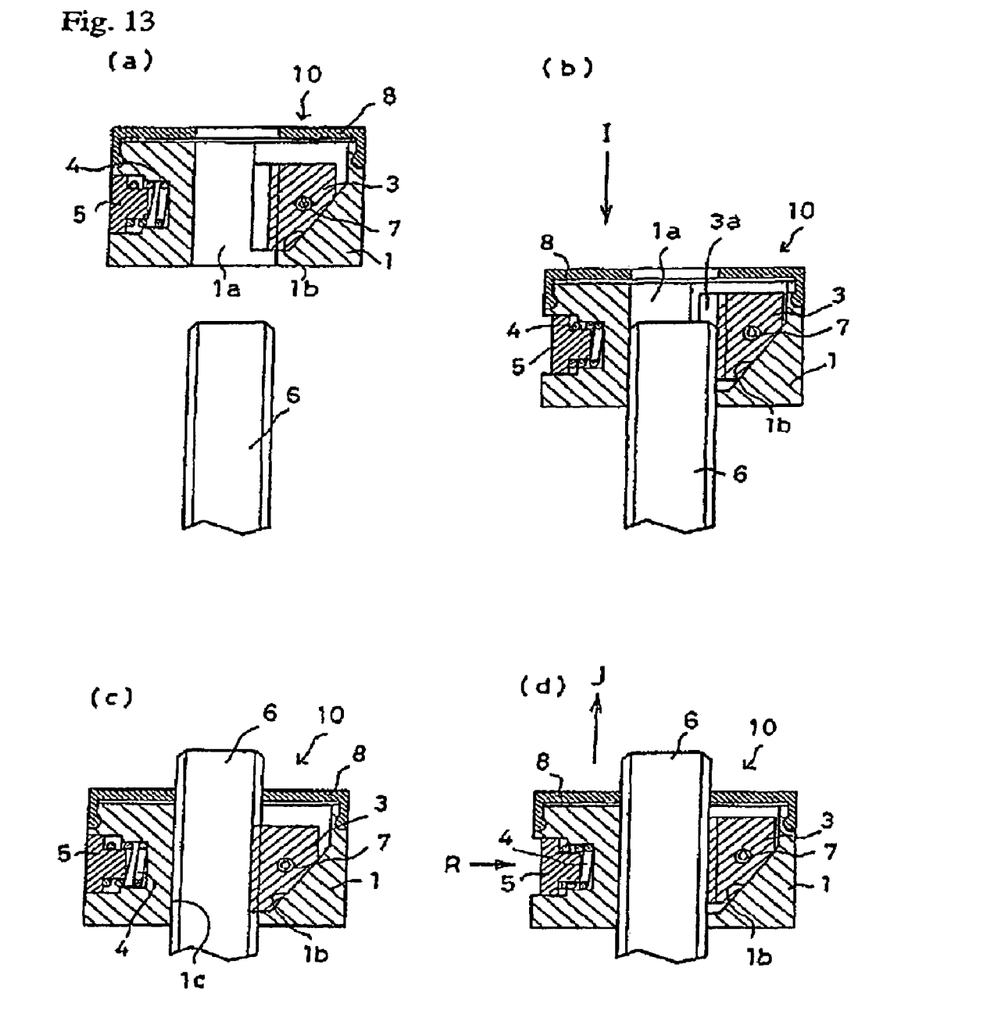

FIGS. 1 to 13 show the first embodiment of the simple fastening device 10 of the present invention. FIG. 1 is a perspective view of the simple fastening device 10 in a disassembled condition; FIGS. 2(a), (b), and (c) are a plan view, a side view, and a left-side view, respectively, of the first embodiment; FIG. 3 is an A-to-A cross-sectional view of FIG. 2(a); FIG. 4 is a B-to-B cross-sectional view of FIG. 3; FIGS. 5 to 7 show the case 1; FIG. 8 shows the lock piece 3; FIGS. 9 to 11 show the releasing member 5; FIG. 12 shows the cap 8; and FIG. 13 shows the fastening operation.

The simple fastening device 10 in this embodiment is used for fastening the bolt 6 as the axial member, and the simple fastening device 10 is provided with a case 1, a lock piece 3, a spring 4, and a releasing member 5.

The case 1 is formed so as to have a hexagonal-shaped outline in terms of its plane view, so that the turning operation that is conducted to fasten a bolt 6 is improved. Inside the case 1 is an insertion hole 1a, through the central part of which the bolt passes from top to bottom when being inserted, as shown in FIGS. 5 to 7. A tapered section 1b is formed so as to face the insertion hole 1a. The tapered section 1b has a slanted surface, which gradually increases the diameter of the cylindrically shaped insertion hole 1a from the bottom to the top and which gradually extends away from the bolt 6 along the insertion direction of the bolt 6. The cylindrical surface of the insertion hole 1a facing the tapered section 1b becomes a supporting wall 1c that supports the outside of the bolt 6 when the lock piece 3 engages with the bolt 6 in the insertion hole 1a.

The lateral surface of the case 1 is constricted at both its top and bottom edges, and a pair of guide grooves 1d are formed in parallel on that lateral surface. The pair of guide grooves 1d are formed in the direction perpendicular to the extending direction of the insertion hole 1a. The guide arms 5b of the releasing member 5 (described later) slide in the guide grooves 1*d*, whereby steady movement of the releasing member 5 can be achieved.

Further, a socket 1*e* is formed in the case 1 to receive the spring 4 (described later). The socket 1*e* is formed perpendicular to the extending direction of the insertion hole 1*a* (insertion direction of the bolt 6), and said socket 1*e* has a structure that includes a bottom, by which the socket 1*e* is cut off from the insertion hole 1*a*.

Moreover, a pin hole 1*f* is formed in the case 1 (See FIG. 6). The pin hole 1*f* is for the spring pin 7 (described later) to penetrate through, and a pair of pin holes are formed on the lateral surface of the case 1 on which the guide grooves are formed. The pin holes 1*f* are long holes having the same slope as that of the tapered sections 1*b*, and they function to regulate the movement of the spring pin 7. Also, on the top surface of the case 1, an engagement groove is formed to engage with a cap 8 (see FIG. 5).

Because the lock piece 3 engages with the bolt 6 by meshing with the bolt 6, a female thread is formed as engagement teeth on the surface of the lock piece 3 so as to face the bolt 6. The lock piece 3 slides on the tapered section 1*b*, and a slide surface 3*b*, which faces the tapered section 1*b*, has the same inclination as that of the tapered section 1*b*. The lock piece 3 has a lateral through-hole as a pin hole 3*c* through which the spring pin 7 penetrates. The spring pin 7 is pressed into the pin hole 3*c*, and the diameter of the pin hole 3*c* in circular shape is smaller than that of the spring pin 7. In this embodiment, a single lock piece 3 is used.

The spring 4 is inserted into the socket 1*e* that is formed on the lateral surface of the case 1. Here, the spring 4 is a coil spring, but it can be a different type of elastic member, such as a spring washer. The spring 4 forces the releasing member 5 in the direction perpendicular to the extending direction of the insertion hole 1*a* (insertion direction of the bolt 6). The spring 4 forces the lock piece 3 through the releasing member 5 in the direction necessary to engage with the bolt 6.

In its plane view, the releasing member 5 is formed "in a ⊂ shape (like a Romanized letter C that has squared corners, and whose top and bottom lines are elongated), because the guide arms 5*b* of the releasing member 5 are bent perpendicular at the corners of the arm 5*a*, as shown in FIGS. 9 to 11. The releasing member 5 is installed on the outside of the case 1 by inserting the guide arms 5*b* into the guide grooves 1*d* so that they slide. And a cylinder 5*c*, which is formed on the surface of the arm 5*a* facing the case 1, is inserted into the socket 1*e* of the case 1 so that the cylinder 5*c* receives the spring 4 in the socket 1*e*, so that the force of the spring 4 thereby forces the releasing member 5. The releasing member 5 is installed in the case 1 so as to move linearly in the direction perpendicular to the insertion direction of the bolt 6, and it functions to release the lock piece 3 from fastening to the bolt 6 by moving linearly in a single direction (to the right).

Pin holes 5*d* are formed on the releasing member 5. The pin holes 5*d* are formed at the edges (right edges) of each of the two guide arms 5*b*. In this embodiment, the pin holes 5*d* are long holes that extend vertically (in the insertion direction of the bolt 6). The spring pin 7 is inserted into the pin holes 5*d*, which regulates the movement of the spring pin 7.

As shown in FIG. 4, the spring pin 7 is inserted through the lock piece 3, the case 1, and the releasing member 5. With the insertion of the spring pin 7, the releasing member 5 is jointed with the lock piece 3 so that the spring 4 pushes the lock piece 3 through the releasing member 5.

As shown in FIG. 12, the cap 8 is formed in a shape of a hexagon, is the same size as the case 1, and is installed on the top of the case 1 in a fitting-together fashion. For the cap 8 and the case 1 to fit together, a convex ridge 8*a* is formed along the bottom edge of the cap 8 to engage with the engagement groove 1*g* of the case 1. At the center of the cap 8 is a circular hole 8*b* through which the bolt 6 passes. The cap 8 is a member that hides the lock piece in the case 1 so as to prevent it from being viewed from the outside, although this member can be omitted without affecting the basic function.

The simple fastening device 10 of this embodiment is assembled as follows: the lock piece is disposed in the tapered section 1*b* in the case 1, the spring 4 is set in the socket 1*e* in the case 1, the guide arms 5*b* of the releasing member 5 are inserted into the guide grooves 1*d* in the case 1, the spring pin 7 is inserted from the pin hole 5*d* of the releasing member 5 into the pin hole 1*f*, and the spring pin 7 is press-fit through the pin hole 3*c* of the lock piece to the opposite end, thereby jointing the releasing member 5 with the lock piece 3 via the spring pin 7, with the single spring 4 forcing the releasing member 5 and the lock piece 3 together. The spring 4 forces the releasing member 5 in the direction shown by the arrow P in FIG. 2(*b*), and forces the lock piece on the tapered section in the direction shown by the arrow Q in the diameter-decreasing direction of the insertion hole 1*a* (direction for engaging with the bolt 6) in FIG. 3.

The simple fastening device of this kind has a small number of components and a simple structure, facilitating assembly. After assembly as described above is finished, the case 1 is covered by the cap 8, so that the simple fastening device is ready to be used.

FIG. 13 shows the procedure of fastening the simple fastening device 10 of this embodiment to the bolt 6. First, the relative positions of the insertion hole 1*a* of the case 1 and the bolt 6 are set so that they face each other as shown in FIG. 13(*a*). Then, as shown in FIG. 13(*b*), the bolt 6 is placed in the insertion hole 1*a* by moving the simple fastening device 10 against the spring pin 7 and the spring 4 and in the direction indicated by the arrow I. Hence, the lock piece 3 moves upwards along the tapered section 1*b* so as to move back from the bolt 6. In this process of moving back, the female thread of the lock piece 3 does not mesh with the bolt 6. Thus, the insertion is finished by only pushing—without turning—the simple fastening device 10 (see FIG. 13(*c*)). After the insertion, the lock piece 3 moves downward along the tapered section 1*b* due to the force of the spring 4, engaging with the bolt 6. After or before the engaging, by turning the case 1 as if tightening a screw, the lock piece 3 and the bolt 6 mesh together and the fastening is thereby completed.

In this fastening, the side of the bolt 6 opposite to the side for engaging it with the lock piece 3 is supported by having contact with the supporting wall 1*c* of the insertion hole 1*a*. Hence, rigid and steady fastening to the bolt 6 is possible.

In order to remove the bolt 6, the simple fastening device 10 is loosened a little (for example, the device is turned in the direction opposite to that of fastening), the releasing member 5 is pushed in the direction shown by the arrow R, and the releasing member 5 is moved linearly in the direction perpendicular to the insertion direction of the bolt 6 against force of the spring 4. As the releasing member 5 moves, the lock piece 3, connected with the releasing member 5 through the spring pin 7, moves upward along the tapered section 1*b*. The lock piece 3 moves in the direction for moving back from the bolt 6. Thanks to this movement of the lock piece 3, the lock piece 3 is released from its being engaged with the bolt 6, thereby releasing it from being fastened to the bolt 6. Hence, the bolt 6 can be removed by moving it in the direction shown by the arrow J in FIG. 13(*d*).

In this embodiment, releasing the lock piece 3 from being fastened to the bolt 6 can be done by linearly moving the releasing member 5 without turning, resulting in improved usability.

The spring 4 forces the releasing member 5, which is jointed with the lock piece 3 by the spring pin 7, so that the releasing member 5 and the lock piece 3 automatically return to their original positions, the standby state, due to the force of the spring 4 after the bolt 6 is removed. Accordingly, re-fastening of the lock piece 3 to the bolt 6 can be done without any extra operation. Therefore, no operation is necessary to return the releasing member 5 and the lock piece 3 to the standby state when putting the bolt 6 in and out, leading to excellent usability.

Further, releasing the lock piece 3 from fastening to the bolt 6 is carded out by linearly moving the releasing member 5 in the direction perpendicular to the insertion direction of the bolt 6, so that the releasing member 5 does not interfere with the bolt 6, leading to improved usability.

Still further, for either fastening the lock piece 3 to the bolt 6 or releasing it from being fastened to the bolt 6, the lock piece 3 slides on the tapered section 1b so that sure movement of the lock piece is possible, resulting in steady operation of fastening and releasing.

Still further, the pin holes 1f of the case 1 and the pin holes 5d of the releasing member 5 through which the spring pin 7 penetrates are long holes, so that the spring pin 7 can be moved smoothly, leading to smooth movement of the lock piece 3.

Figure 14:
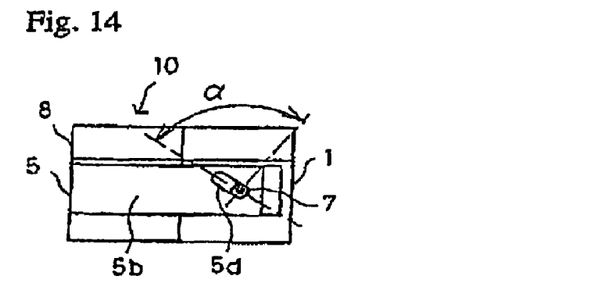
FIG. 14 is a front view of a variation of the first embodiment.

In the above embodiment, the pin holes 5d—which are long holes—of the releasing member 5 are formed vertically. However, the pin holes 5d can also be formed so as to be sloped. FIG. 14 shows the pin hole 5d sloping at an angle of θ, which is an angle slanting in the direction opposite of that of the tapered section 1b. Pushing the spring pin 7 can be made easier by making the slope at the angle θ. In order to make the operation the easiest, the angle θ should be a right angle against the slope of the tapered section 1b.

The Second Embodiment

Figure 15:
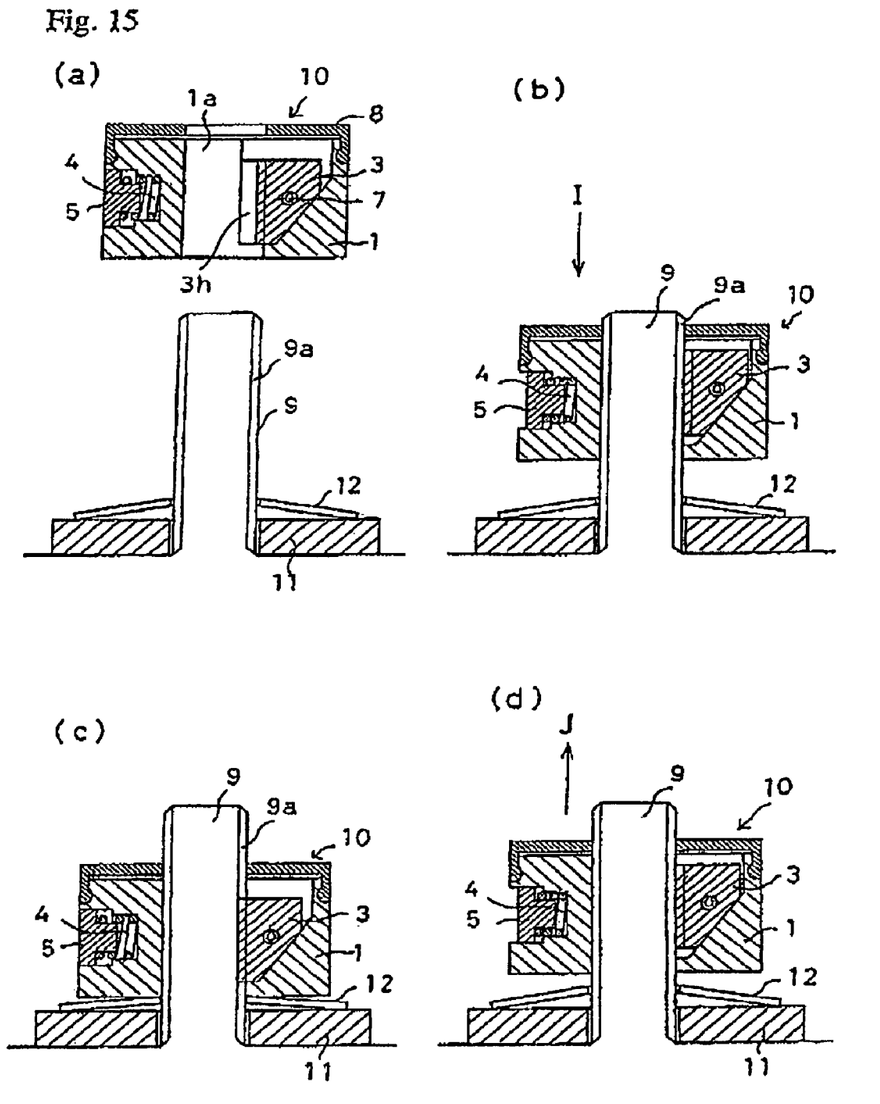

FIG. 15 shows the procedure of fastening in the second embodiment. In this embodiment, the axial member 9 has saw-tooth-shaped circular engagement teeth 9a along its outer periphery, and the lock piece 3 has similar circular engagement teeth 3h to engage with the engagement teeth 9a of the axial member 9. The axial member 9 is provided with a fixing member 11. Strengthened fastening or fastening in a similar manner to that of the first embodiment—where engagement is done by screwing the members together—is not possible in this structure.

In this embodiment, an elastic member 12, such as a spring washer, is disposed on the fixing member 11 between the fixing member 11 and the simple fastening device 10. The simple fastening device 10 is fastened to the axial member 9 by being moved in the direction shown by the arrow I, a which the axial member 9 is pushed into the insertion hole 1a, as in the first embodiment (see FIGS. 15(a) and (b)).

As a result of being moved in the direction shown by the arrow I, the simple fastening device 10 presses the elastic member 12 on the fixing member 11. The elastic member 12 bows as it is pressed (see FIG. 15(c)), so that the pressure of the elastic member 12 can affect the fixing member 11. As the elastic member 12 is pressed, the engagement teeth 3h of the lock piece 3 engage with the engagement teeth 9a of the axial member 9. In this way, the pressure of the elastic member 12 enables stable fastening. FIG. 15(d) shows the axial member 9 in the process of being removed after being released from fastening, which is achieved by the same operation as in the first embodiment.

The Third Embodiment

Figure 16:
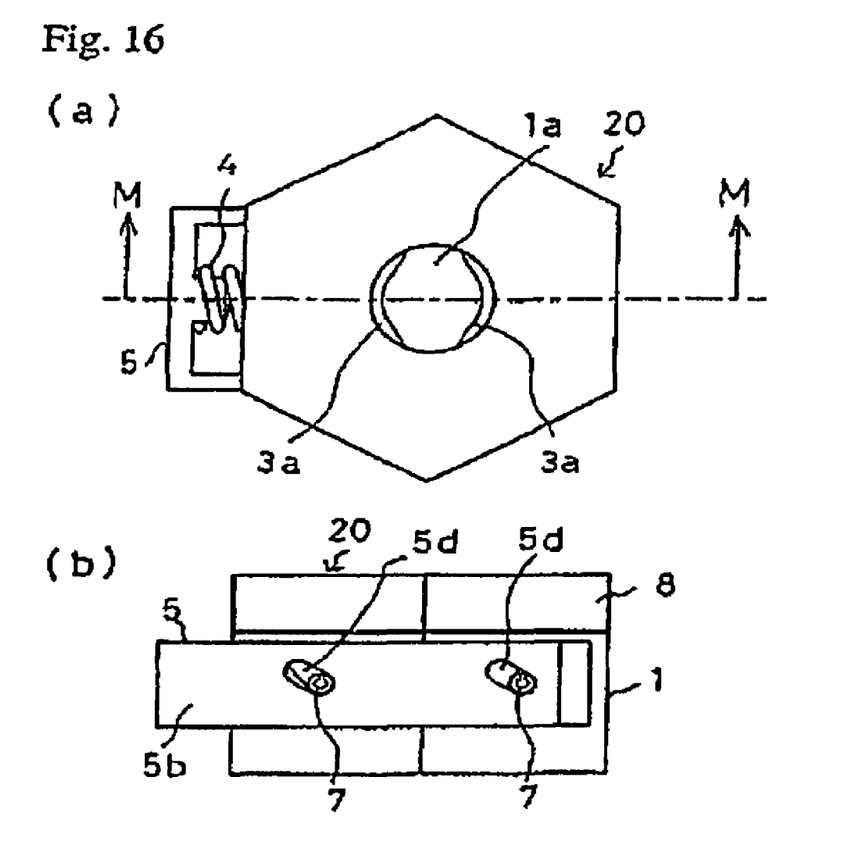
Figure 17:
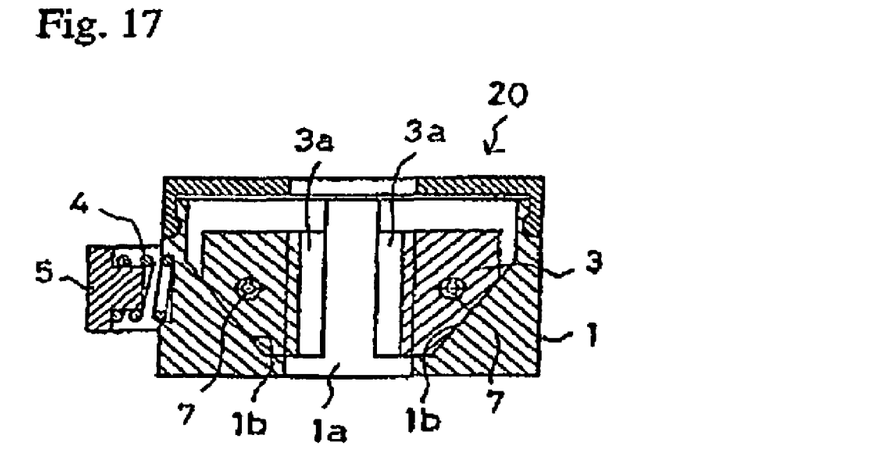
FIG. 17 is an M-to-M cross-sectional view of the third embodiment.

FIGS. 16 and 17 shows the simple fastening device 20 in the third embodiment. In this embodiment, two lock pieces 3 are used.

As shown in FIG. 17, a pair of lock pieces 3 are formed so as to face the tapered sections 1b in the case 1. A pair of the tapered sections 1b are arranged on the opposite sides of the insertion hole 1a, and they are sloped such that their diameters gradually increase from bottom to top along the insertion hole 1a, extending away from the axial member (not shown in FIG. 17).

The lock pieces 3 are set to slide along the tapered sections 1b with the engagement teeth 3a facing each other. The engagement teeth 3a are formed so as to engage with the engagement teeth of the axial member, and are female threaded if the engagement teeth of the axial member are male threaded.

On the guide arms 5b of the releasing member 5, pin holes 5d are formed to face each lock piece 3. The pin holes 5d are long holes through which the spring pin 7 penetrates, and said pin holes 5d are sloped at an angle that faces opposite to the tapered section 1b, in the same manner as shown in FIG. 14. Two lock pieces 3 engage with the releasing member 5 via the spring pin 7. Thus, the force from the spring 4 is applied on each of the lock pieces 3 via the releasing member 5.

In this embodiment, the two lock pieces 3 move back from the axial member, sliding upwards along the tapered sections 1b due to the axial member being inserted into the insertion hole 1a. After moving back, the lock pieces 3 engage with the axial member from both sides in order to be fastened. Accordingly, fastening is made by a one-step operation. The structure in which engagement is done by two lock pieces 3 enables them (two lock pieces 3) to be fastened to the axial member rigidly, making for steady fastening.

As in the first embodiment, in order to remove the axial member the releasing member 5 is moved linearly in the direction perpendicular to the insertion direction of the axial member, against the force of the spring 4, and the two lock pieces 3 are moved upward along the tapered sections 1b via the spring pin 7 so as to move back the two lock pieces 3 from the axial member. Hence, releasing the axial member from fastening with two lock pieces 3 is possible. Also, for this releasing, linear movement of the releasing member 5 is carried out, leading to improved usability.

The Fourth Embodiment

Figure 18:
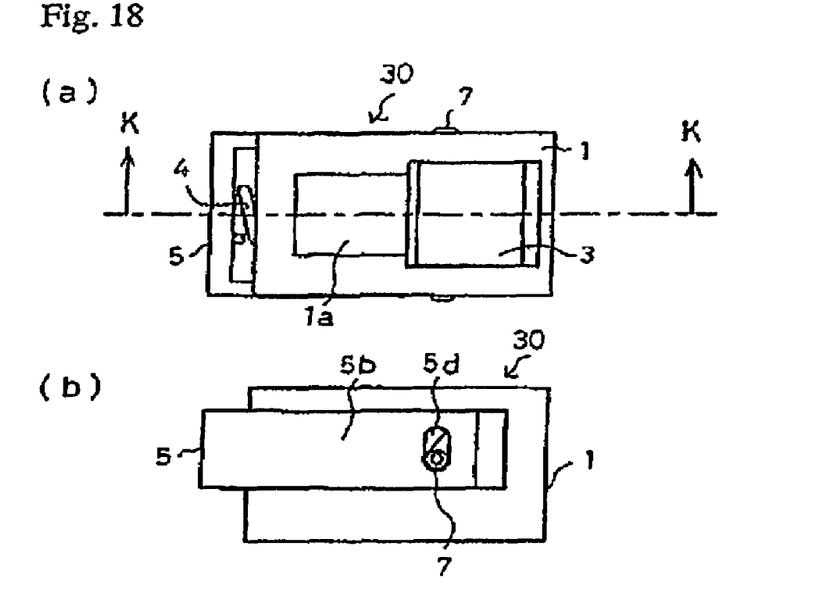
Figure 19:
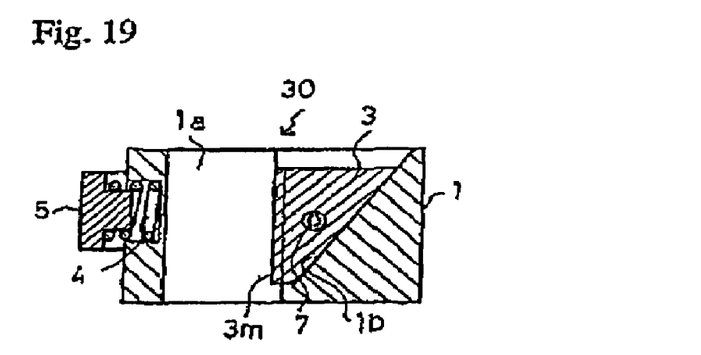
FIG. 19 is a K-to-K cross-sectional view of FIG. 18(a).
Figure 20:
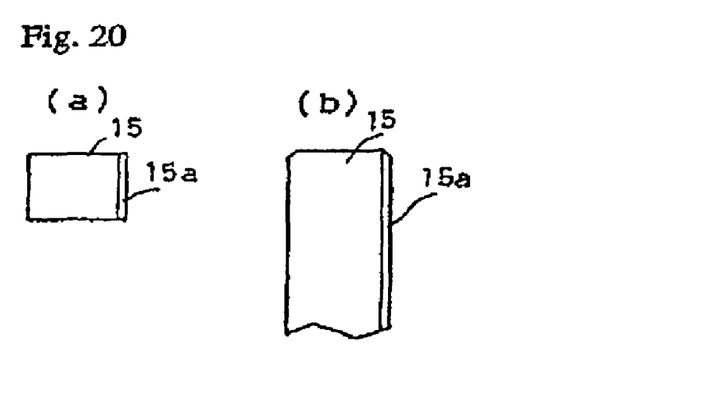

FIGS. 18 to 20 show the simple fastening device 30 in the fourth embodiment. This embodiment is applied where the axial member 15 has a rectangular shape.

On the surface of the axial member 15, whose cross-section is rectangular, engagement teeth 15a are formed. The engagement teeth have grooves (in a saw-toothed shape, for example) that extend in the direction perpendicular to the axial direction of the axial member 15. The insertion hole 1a of the case, through which the axial member 15 penetrates, is formed to be rectangular because the axial member 15 is rectangular (see FIG. 18). The engagement teeth 3m of the lock piece 3 are formed in the same shape as those of the engagement teeth 15a of the axial member 15.

The structure is in other respects the same as that of the first embodiment, and this embodiment's operations for fastening the lock piece 3 to the axial member 15 and releasing it from such fastening are the same as those of the first embodiment. In this case, the axial member 15 is rectangular, and thus, fastening is not carried out by turning, but by forcing the lock piece 3 to engage with the axial member 15 due to the force of the spring 4. Also, in this embodiment the cap 8 is omitted.

The present invention is not limited to the above embodiments, and a variety of other embodiments are possible. For instance, linear movement of the releasing member 5 could intersect with the insertion of the axial member, and such intersecting need not be at a right angle. Also, the guide arms 5b do not necessarily need to be a pair, but can be a single arm. In addition, the releasing member 5 can be jointed with the lock piece 3 by a simple pin.

INDUSTRIAL APPLICABILITY

The simple fastening device of the present invention enables lock pieces to be fastened to the axial member by a one-step operation and to be released from being fastened by linearly moving the releasing member, thereby improving the releasing operation. The releasing member and the lock pieces automatically return to their original positions, which is the standby state for re-fastening, by the force of the spring, so that no extra operation to move the axial member in and out is necessary to return the device to its original standby state, thereby improving usability. Further, the device's simple structure promotes easy assembly.

What is claimed is:

1. A fastening device, comprising:
   a lock piece slidably disposed in a case and biased by a spring toward a fastening position wherein it is engage with an axial member in a case,
   a releasing member connected with the lock piece by a pin and disposed in the case, said releasing member being configured for manual bias to move linearly toward the axial member and to displace the lock piece away from the fastening position, thereby releasing the lock piece from the axial member, wherein:
   guide grooves that extend in the direction perpendicular to the insertion direction of the axial member, are formed on an outer surface of the case,
   the releasing member has guide arms that slide in the guide grooves, and
   the guide arms and the lock piece are interconnected by the pin.

2. The fastening device described in claim 1, wherein said releasing member moves in the direction perpendicular to the insertion direction of the axial member, and said spring forces the releasing member to move in the direction perpendicular with respect to and away from the axial member.

* * * * *